United States Patent Office 3,373,976
Patented Mar. 19, 1968

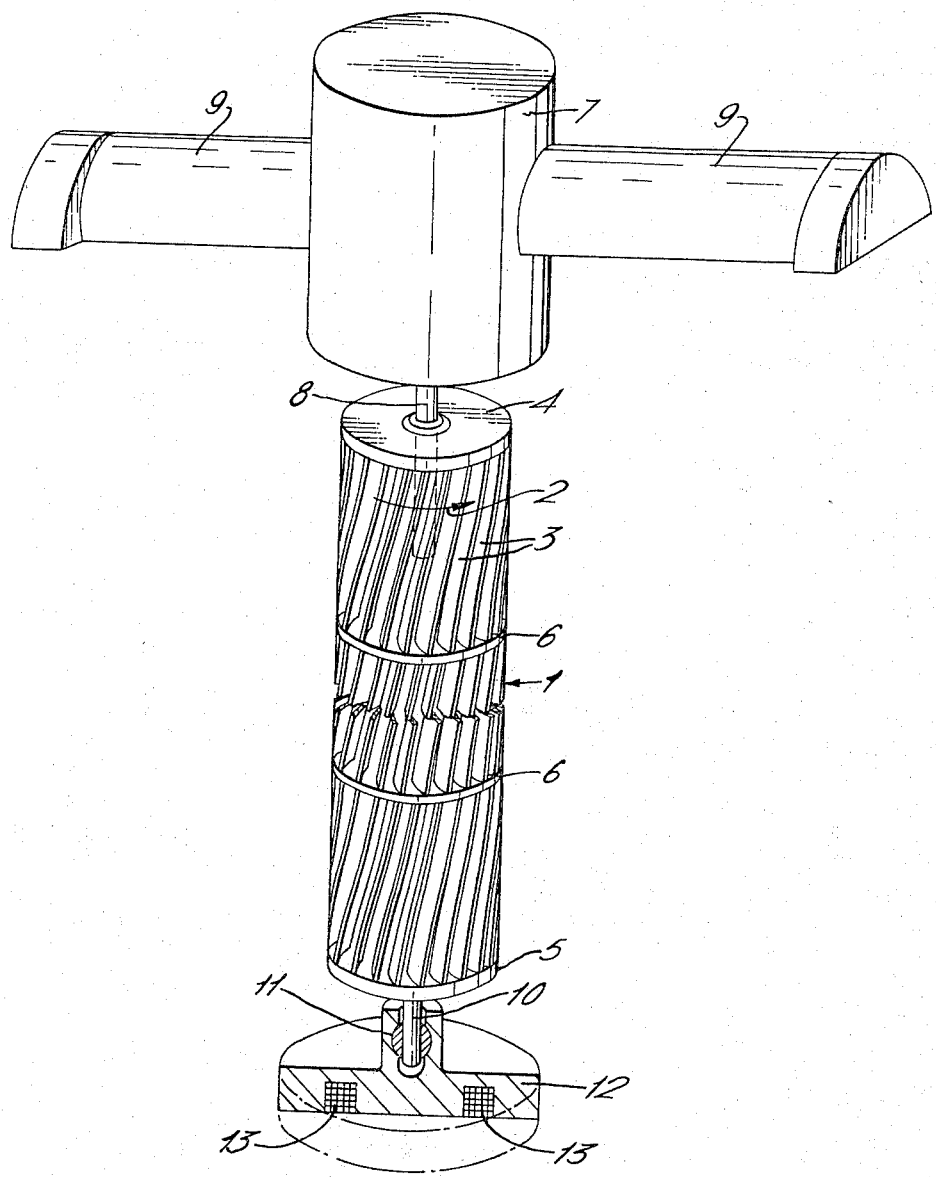

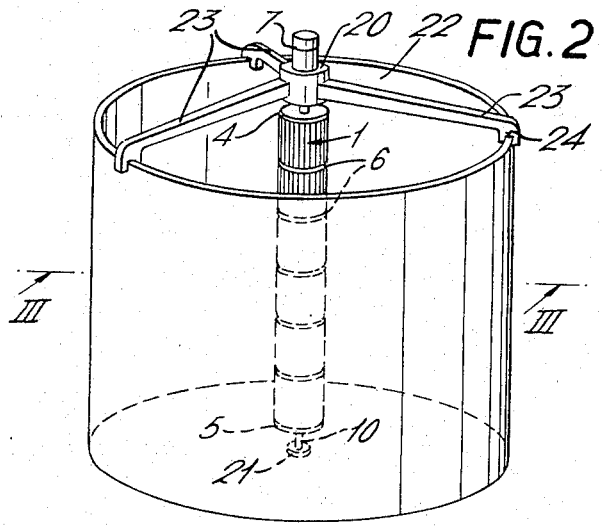
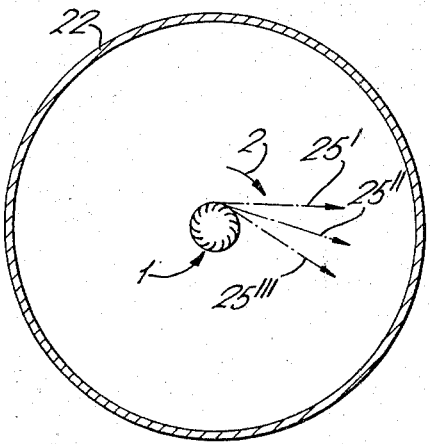
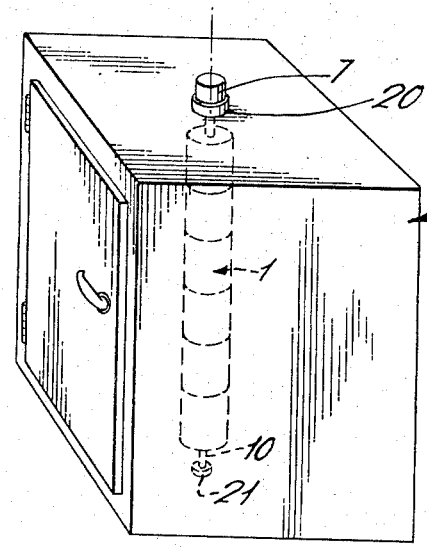
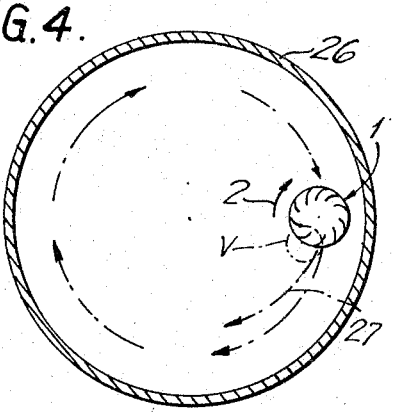

3,373,976
FLOW MACHINES
Nikolaus Laing, Aldingen, near Stuttgart, Germany, assignor to Laing-Vortex, Inc., New York, N.Y., a company
Continuation-in-part of application Ser. No. 450,749, Apr. 26, 1965. This application Feb. 17, 1966, Ser. No. 528,204
3 Claims. (Cl. 259—135)

This application is a continuation-in-part of my copending application Ser. No. 450,749 filed April 26, 1965, now abandoned, itself a continuation of application Ser. No. 9,094 filed February 16, 1960, now abandoned.

This invention relates to flow machines, that is, machines for inducing movement of fluid (which term is understood to comprise fans, pumps and mixers), especially such machines as are not required to produce great static pressure. The invention more particularly concerns flow machines comprising bladed cylindrical rotors and in which the fluid flows twice through the path of the rotating blades and generally in planes transverse to the rotor axis.

U.S. patent specification 2,942,773 of Bruno Eck is one of a number of patent specifications which disclose fans of the cross flow type, that is, comprising a bladed cylindrical rotor and guide means co-operating therewith to induce a flow of air twice through the path of the rotating blades and generally in planes transverse to the rotor axis. As described in these patents the guide means comprises end walls substantially aligned with the ends of the rotor and a pair of guide walls extending lengthwise of the rotor and defining an entry region and an outlet duct. A main advantage of fans of the cross-flow type lies in the fact that the rotor can be of any desired length subject only to considerations of mechanical design; the fan can therefore be made to produce a discharge of any desired rectangular section, subject only to such mechanical considerations. Application Ser. No. 221,621 filed September 5, 1962, now Patent No. 3,232,522, by the present applicant describes how a flow machine having a rotor and guide means as just mentioned can be designed to produce a vortex of Rankine type having a core region which is eccentric of the rotor axis and interpenetrates the path of the rotating blades in a position which is defined by the guide means: this form of flow is advantageous inter alia because of the relatively large throughput which can be obtained. The vortex core region is a region of low static pressure; as described in preferred embodiments of application 221,621 precautions are taken to avoid entry of fluid endwise into this region.

The present invention depends in part on the appreciation that a bladed cylindrical rotor having forwardly curved blades can form a vortex even if rotated free of any guide wall, for example in the middle of a cylindrical chamber whose walls are remote from the rotor. In such case the vortex will rotate slowly like the beam of a beacon. A rotor rotating under these conditions may, according to one aspect of the invention, be utilized as a mixer for stirring liquid in a container or circulating air or gas within an oven or furnace, for example.

The invention in part also relies on the concept that a satisfactory vortex can form in the absence of any end walls to prevent endwise movement of fluid, provided the rotor is sufficiently long, since I have found that with a long rotor the influence of open ends does not extend to the central portion of the rotor. The vortex is however attenuated in the end portions of the rotor, and for a short rotor end walls are still required.

Yet another appreciation which in part underlies the present invention is that to stabilize the vortex in angular position it is only necessary that the rotor should run adjacent a single wall portion. Thus the invention comprehends apparatus comprising a container wherein a cylindrical bladed rotor is rotated in the vicinity of and parallel to one wall of the container, so as to set up a steady circulation of fluid within the container. This concept may alternatively find embodiment in a fan comprising a cylindrical bladed rotor and guide means co-operating therewith and consisting of a single arcuate wall which, starting at a line of nearest approach to the rotor, diverges steadily therefrom going in the direction of rotor rotation.

In order that the invention should be further understood, various different forms of flow machine embodying one or various combinations of the different novel appreciations above set forth will now be described by way of example only with reference to the accompanying drawings, in which:

FIGURE 1 is a perspective view from one side, with part sectioned and part cut away, of a mixer according to the invention;

FIGURE 2 is a perspective view of another mixer according to the invention, inside a container;

FIGURE 3 is a horizontal section through the FIGURE 2 mixer and container;

FIGURE 4 is a horizontal sectional view of a mixer within a container, showing an alternative arrangement to that of FIGURE 3; and FIGURE 5 is a perspective view of another mixer according to the invention in an oven.

In the various embodiments similar reference will be used for similar parts.

Referring to FIGURE 1 of the drawing, the mixer shown therein comprises a cylindrical bladed rotor designated generally 1 which is intended, in use, to be mounted substantially vertically in a container for liquid and rotated therein in the direction of the arrow 2. The rotor comprises a series of forwardly curved blades 3 arranged in a ring about the rotor axis and mounted between axially aligned upper and lower end discs 4, 5, and rigidified by intermediate discs or rings 6 spaced at intervals along the length of the rotor. The blades 3 are disposed helically about the axis, with their upper ends leading their lower ends in the direction of rotation shown by the arrow 2, so that a portion of the torque applied to the rotor will be transmitted along it in the form of tension in the blades. The rotor 1 is driven by an electric motor 7 having its shaft 8 directly connected to upper end disc 4. Handles 9 project radially from the motor 7. The bottom end disc of the rotor 1 carries a stub shaft 10 journalled in a self-aligning bearing 11 in a foot member 12 containing permanent magnets 13.

In operation to stir liquid in a container having a ferromagnetic bottom, the mixer is lowered into the container by the handles 9 until the foot member 12 touches the bottom, when the magnets 13 will hold this member in position thereon. With the handles 9 fixed or firmly held, the motor 7 is energized and the rotor rotates. The action of the rotor on the fluid may be as described with reference either to FIGURE 3 or to FIGURE 4.

The mixer of FIGURE 2 employs a long rotor 1 but does not have its helical blades. The rotor 1 is driven by a motor 7 through a gear box 20 and its lower end is supported by a bearing 21 which fits into a central hole in the bottom of the container 22. Equal radial arms 23 fixed to the gear box 20 terminate in grooved lugs 24 which locate on the rim of the container. This arrangement holds the rotor central and vertical. The whole mixer can be lifted out if necessary.

In operation as explained in FIGURE 3, the rotor is rotated within liquid filling the container, and in the direction of the arrow 2, and a vortex forms having a core region eccentric of the rotor axis and rotating thereabout at a speed which is a small fraction of the speed of the rotor. The rotor delivers a relatively rapid stream of liquid tangentially in a direction which changes as the vortex rotates: the stream swings around the container like the beam of a rotating beacon. This is illustrated by the arrows 25′, 25″, 25‴, showing the stream, issuing from the rotor at successive moments of time. This rotating liquid stream has an intense mixing effect.

FIGURE 4 illustrates a modification of the apparatus of FIGURE 2, wherein, by for example having supporting arms like the arms 23 but of different length, the rotor 1 runs adjacent and parallel to the vertical wall 26 of the container 22. In this position of the rotor, the vortex core region here designated V is stabilized eccentric of the rotor axis and away from the wall. By virtue of the vortex, a stream of liquid is delivered in the direction of the arrow 27: the direction of this stream remains constant because the vortex is stabilized in position, so that the whole contents of the container is given a circulatory motion in the direction of arrow 27.

It is to be understood that flow through the rotor takes place from an entry region, through the path of the rotating blades of the rotor to the interior thereof and thence again through the path of the rotating blades to a discharge side, so that fluid always twice traverses the path of the rotating blades. The vortex core region is a more or less cylindrical body of fluid which rotates on itself continuously without becoming part of the throughput. If the vortex core region is stabilized in position, as shown in FIGURE 4, the entry and discharge regions, which the core region defines, are also stabilized in position. If the vortex core region rotates, as in the FIGURE 3 arrangement, the entry and discharge regions are continuously changing too. For a further description of vortex flow through a bladed cylindrical rotor my aforesaid application 221,621 is referred to:

Referring back to FIGURE 1, it will be understood that the mixer there shown will operate as described in FIGURE 3 or 4, depending on whether the rotor 1 is placed centrally within the container or adjacent a side wall thereof.

FIGURE 5 illustrates an oven 30 having a mixer therein. The mixer is similar to that of FIGURE 2, except that the arms 23 are omitted and the gear box 20 is secured directly to the top wall 31 of the oven. The rotor 1 extends vertically and centrally through the oven 30, and operates in the manner illustrated in FIGURE 3. If desired, the rotor could be mounted adjacent a vertical wall or corner of the oven 30 when it would operate in the manner described with reference to FIGURE 4. The rotor could also be mounted horizontally, whether centrally or adjacent a side or corner, and the effect would be similar.

I claim:
1. A mixer comprising a long bladed cylindrical rotor having forwardly curved blades and adapted for vertical mounting in a fluid to be mixed, a foot bearing of self-aligning type mounted in a magnetic foot with said bearing being connected to the lower end of said rotor, and drive means for the rotor at the upper end.

2. A fluid mixer comprising a long hollow bladed cylindrical rotor having a plurality of blades defining the outer periphery thereof with said blades being curved in the direction of rotor rotation, end disc mounting said blades and substantially closing the ends of said rotor, drive means operatively connected to one end of said rotor for rotating the same, and foot bearing means of the self-aligning type mounted in a magnetic foot at the opposite end of said rotor from said drive means for supporting said rotor; said rotor on rotation forming a fluid vortex having a vortex core interpenetrating the path of the blades with said core forming with said rotor a suction area and a discharge area whereby fluid will be caused to flow into the rotor through said suction area and to be discharged from the rotor through said pressure area.

3. A fluid mixer comprising a long hollow bladed cylindrical rotor having a plurality of blades defining the outer periphery thereof with said blades being curved in the direction of rotor rotation and wherein the blades are disposed helically about the periphery of the rotor with one end of each blade trailing with respect to the opposite end, end discs mounting said blades and substantially closing the ends of said rotor, drive means operatively connected to one end of said rotor for rotating the same, and bearing means at the opposite end of said rotor from said drive means for supporting said rotor; said rotor on rotation forming a fluid vortex having a vortex core interpenetrating the path of the blades with said core forming with said rotor a suction area and a discharge area whereby fluid will be caused to flow into the rotor through said suction area and to be discharged from the rotor through said pressure area.

References Cited

UNITED STATES PATENTS

| 2,015,244 | 9/1935 | Stockdale | 259—107 |
| 2,082,796 | 6/1937 | Gaertner | 259—107 |
| 2,459,224 | 1/1949 | Hendricks | 259—108 |
| 2,942,773 | 6/1960 | Eck | 230—125 |

FOREIGN PATENTS

| 1,201,588 | 7/1959 | France. |
| 12,230 | 3/1881 | Germany. |
| 827,782 | 1/1952 | Germany. |

WILLIAM I. PRICE, *Primary Examiner.*